United States Patent
Kobayashi et al.

(10) Patent No.: US 10,054,812 B2
(45) Date of Patent: Aug. 21, 2018

(54) LIQUID CRYSTAL DISPLAY DEVICE

(71) Applicant: Japan Display Inc., Minato-ku (JP)

(72) Inventors: Kanae Kobayashi, Minato-ku (JP); Shigeo Nakagawa, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/628,915

(22) Filed: Jun. 21, 2017

(65) Prior Publication Data

US 2018/0011362 A1    Jan. 11, 2018

(30) Foreign Application Priority Data

Jul. 7, 2016 (JP) .................. 2016-134923

(51) Int. Cl.
*G02F 1/1333* (2006.01)
*G02F 1/133* (2006.01)
*G06F 3/041* (2006.01)
*G06F 3/044* (2006.01)

(52) U.S. Cl.
CPC .......... *G02F 1/13338* (2013.01); *G02F 1/133* (2013.01); *G06F 3/044* (2013.01); *G06F 3/0412* (2013.01)

(58) Field of Classification Search
CPC .............. G02F 1/13394; G02F 1/1335; G02F 1/133512; G02F 1/136; G02F 1/1368; G02F 1/136286; G02F 1/133345; G02F 1/1343; G02F 1/134309; G02F 1/1339; G02F 1/134363; G02F 1/133514; G02F 1/136227; G02F 1/13338; G02F 1/136209; G02F 1/133707; G02F 1/1362; G02F 1/1333; G02F 2001/13396; G02F 2001/134318; G02F 2001/136218; G02F 2201/52; G02F 2201/12; G02F 2201/124; G02F 2001/134363; G02F 2001/13394; G09G 2300/0426; G09G 2300/0452; G09G 3/36; G09G 3/3648
USPC .................................................. 349/141, 156
See application file for complete search history.

(56) References Cited

U.S. PATENT DOCUMENTS

| | | | |
|---|---|---|---|
| 6,433,852 B1 * | 8/2002 | Sonoda | G02F 1/134363 349/141 |
| 2015/0097192 A1 | 4/2015 | Araki et al. | |
| 2016/0259476 A1 | 9/2016 | Araki et al. | |
| 2017/0102600 A1 | 4/2017 | Araki et al. | |

FOREIGN PATENT DOCUMENTS

| | | |
|---|---|---|
| JP | 2014-174431 | 9/2014 |
| JP | 2015-75605 | 4/2015 |

\* cited by examiner

*Primary Examiner* — Thoi Duong
(74) *Attorney, Agent, or Firm* — Oblon, McClelland, Maier & Neustadt, L.L.P.

(57) ABSTRACT

A first substrate includes a plurality of pixel electrodes, a plurality of common electrodes on which slits are disposed at predetermined intervals in a first direction and which extend in a second direction, and a plurality of auxiliary wirings that are in contact with and overlap the common electrodes. A second substrate includes a plurality of spacers, a plurality of wall-like sub-spacers, and a color filter layer in which adjacent pixels have different colors from each other. The wall-like sub-spacers are disposed at positions that overlap the slits.

10 Claims, 9 Drawing Sheets

LIQUID CRYSTAL DISPLAY DEVICE

CROSS-REFERENCE TO RELATED APPLICATION

The present application claims priority from Japanese application JP2016-134923 filed on Jul. 7, 2016, the content of which is hereby incorporated by reference into this application.

BACKGROUND OF THE INVENTION

1. Field of the Invention

The present invention relates to a liquid crystal display device.

2. Description of the Related Art

A capacitive touch panel has been employed as an input function of a liquid crystal display device for mobile use, mainly for smartphones. Further, a touch panel-equipped liquid display device has been developed to integrate touch panel functions into an in-cell or on-cell type liquid crystal display device.

JP2015-075605A discloses a liquid crystal display device including a touch panel, in which a common electrode for liquid crystal operation is divided into segments along video signal lines and used as electrodes of the touch panel. The common electrode is formed of a transparent conductive material, such as indium tin oxide (ITO), since the common electrode is required to have light transmissivity. However, a transparent conductive material has high resistance, and thus metal wiring having low resistance is disposed in each transparent conductive material to serve as auxiliary wiring.

In a case where the common electrode is divided along the video signal lines, the auxiliary wiring is also disposed in the direction in which the video signal line extends.

The auxiliary wiring has light-shielding property, and is disposed to overlap a black matrix and a video signal line in order to prevent decreases in aperture ratio. Further, the light-shielding property of the auxiliary wiring can prevent color mixture caused when oblique light rays from the backlight are incident on an adjacent pixel. In this regard, however, arrangement of auxiliary wiring is restricted with respect to a liquid crystal display device including a touch panel. For example, auxiliary wiring cannot be disposed at a position where the common electrode is divided so as to prevent electrical conduction.

A need has developed for a higher definition of a liquid crystal display device. As such, a size of a pixel has been reduced to address the need, which has resulted in color mixture due to light leakage to adjacent pixels in different colors, and various measures have been proposed. In this regard, if width of a light-shielding film is increased in order to address the color mixture issue, pixel opening sizes may be reduced, and high precision and high brightness may be interfered (JP2014-174431A).

SUMMARY OF THE INVENTION

One or more embodiments of the present invention have been conceived in view of the above, and an object thereof is to prevent color mixture.

A liquid crystal display device according to the present invention includes a first substrate, a second substrate, and a liquid crystal layer between the first substrate and the second substrate. The first substrate includes a plurality of pixel electrodes that are one of a pair of driving electrodes for driving the liquid crystal layer, a plurality of common electrodes on which slits are disposed at predetermined intervals in a first direction and which extend in a second direction intersecting the first direction, and a plurality of auxiliary wirings that are disposed at intervals in the first direction, extend in the second direction, and are in contact with and overlap the common electrodes. The second substrate includes a plurality of spacers that keep a space between the first substrate and the second substrate, a plurality of wall-like sub-spacers that extend in the second direction, are lower than at least one of the spacers in height, and have a wall-like shape, and a color filter layer in which at least pixels adjacent in the first direction have different colors from each other. The wall-like sub-spacers are disposed at positions that overlap the slits.

According to the present invention, the wall-like sub-spacers can attenuate light leakage from the slits, and thus it is possible to prevent color mixture of colored layers adjacent in the first direction.

DETAILED DESCRIPTION OF THE INVENTION

An embodiment of the present invention will be described below with reference to the accompanying drawings. However, the present invention can be implemented in various manners without departing from the spirit of the invention, and is not to be interpreted as being limited to the embodiment described below.

In the accompanying drawings, widths, thicknesses, shapes, or other characteristics of each part are schematically illustrated for clarity of illustration compared to actual configurations, although such a schematic illustration is merely an example and not intended to limit the present invention. In the present specification and drawings, some elements identical or similar to those shown previously are denoted by the same reference signs as the previously shown elements, and thus repetitive detailed descriptions of them may be omitted as appropriate.

Further, in the detailed description of the invention, when a positional relationship between a component and another component is defined, if not otherwise stated, the words "on" and "below" suggest not only a case where the another component is disposed immediately on or below the component, but also a case where the another component is disposed on or below the component with a third component interposed therebetween.

Figure 1:
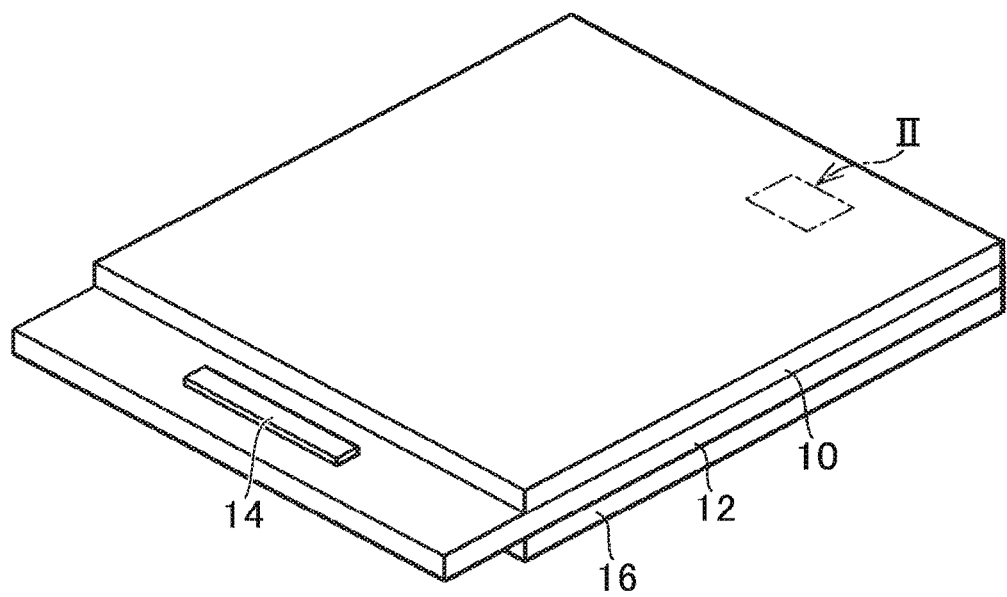
FIG. 1 is a perspective view of a liquid crystal display device according to an embodiment of the present invention.
Figure 2:
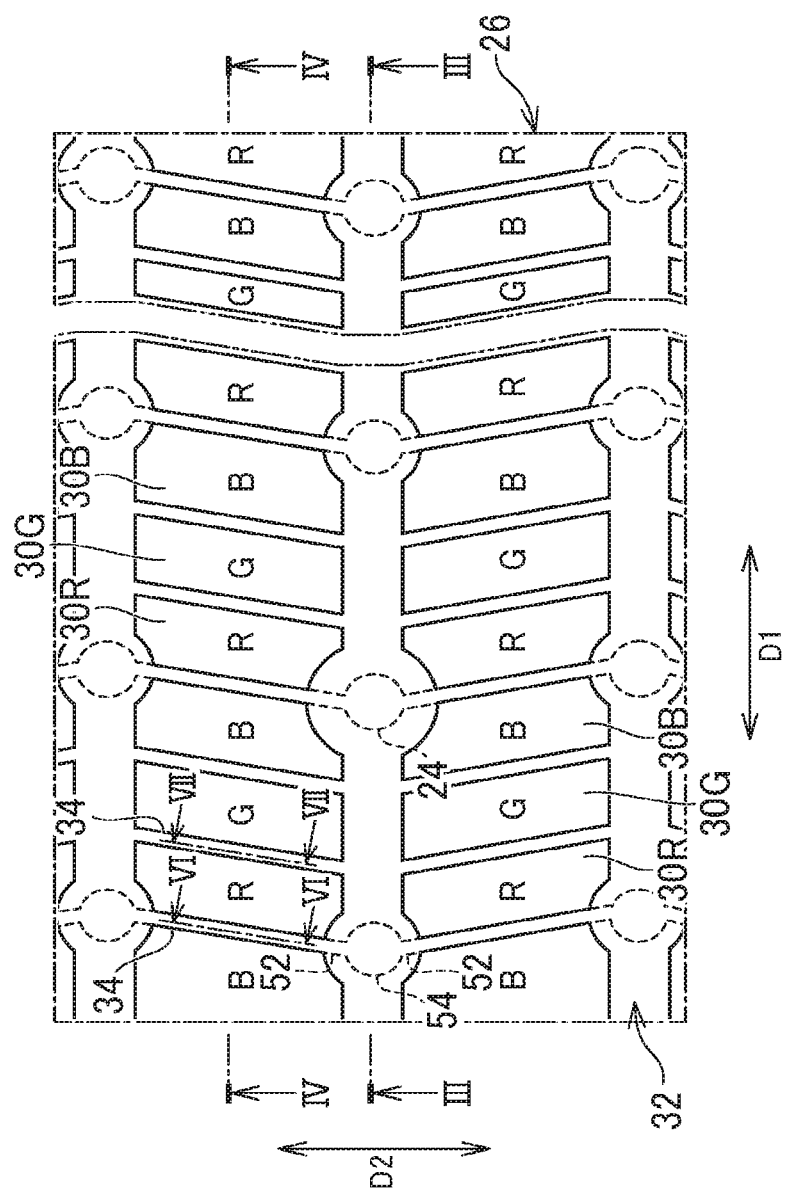
FIG. 2 is an enlarged view of a part shown in II of FIG. 1.

FIG. 1 is a perspective view of a liquid crystal display device according to an embodiment of the present invention. FIG. 2 is an enlarged view of a pixel structure of a part of a display area shown in II of FIG. 1. The liquid crystal display device includes a first substrate 10 and a second substrate 12, which are made of glass, for example, and oppose to each other. The second substrate 12 includes a protrusion that does not overlap the first substrate 10, and the protrusion includes an integrated circuit chip 14 that incorporates a driving circuit for displaying images. A backlight 16 is disposed below the second substrate 12 (on a side opposite to the first substrate 10). The backlight 16 includes a light source, a light guide plate, and an optical film (none of which are shown).

Figure 3:
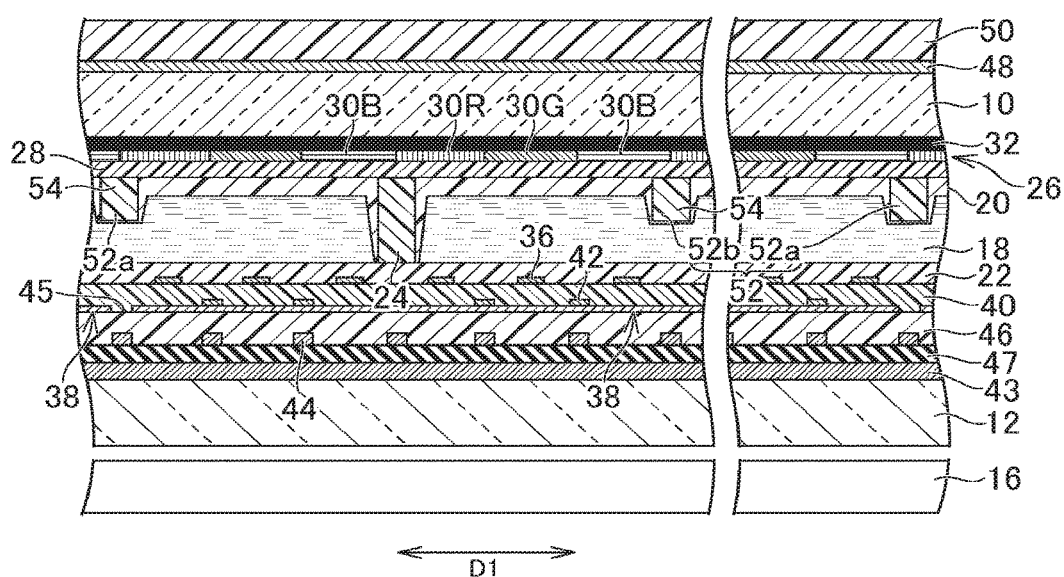
FIG. 3 is a sectional view of a part taken along the line III-III shown in FIG. 2.

FIG. 3 is a sectional view of the part taken along the line III-III shown in FIG. 2. A liquid crystal layer 18 is disposed between the first substrate 10 and the second substrate 12. More specifically, the liquid crystal layer 18 is in contact with a first alignment film 20 on the first substrate 10 side, and in contact with a second alignment film 22 on the second substrate 12 side.

The second substrate 12 is provided with a plurality of scan signal lines 43 extended and disposed in a first direction D1 and video signal lines 44 extended and disposed in a second direction D2. An insulating film 47 is disposed between the scan signal lines 43 and the video signal lines 44.

The scan signal lines 43 are linearly formed in the first direction D1. The video signal line 44 is extended in the second direction D2. The video signal line 44 is obliquely formed to the direction perpendicular to the scan signal lines 43. Specifically, as shown in FIG. 2, the video signal line 44 reverses an angle of tilt each time the video signal line 44 crosses the scan signal line 43. This configuration is for a multi-domain structure and improving viewing angle characteristics.

A gap (cell gap) between the first substrate 10 and the second substrate 12 is maintained by main spacers 24. The main spacers 24 are formed of resin and have light attenuation (e.g., light-shielding property). The main spacers 24 are discretely located on the first substrate 10 at the positions corresponding to intersections of the video signal lines 44 and the scan signal lines 43.

A color filter layer 26 is disposed on the first substrate 10 to form a color filter substrate. An overcoat layer 28 is disposed between the first alignment film 20 and the color filter layer 26. The color filter layer 26 includes colored layers 30R, 30G, and 30B transmitting light in multiple colors (e.g., red (R), green (G), blue (B)).

In this embodiment, a black matrix 32 is disposed between the first substrate 10 and the color filter layer 26. In the manufacturing process, the black matrix 32 is formed on the first substrate 10, and the color filter layer 26 is formed on the black matrix 32. The black matrix 32 is formed at a position that overlaps the scan signal lines 43 and the video signal lines 44 formed on the second substrate 12 side.

As shown in FIG. 2, the colored layers 30R, 30G, and 30B are surrounded by the black matrix 32 (in the specification, the black matrix extending in the second direction D2 is indicated as a light-shielding part 34), and each of the colored layers forms sub-pixels. Three sub-pixels of the colored layers 30R, 30G, 30B form one pixel. In this embodiment, sub-pixels adjacent to each other in the first direction D1 are different from each other in transmitted light colors. Sub-pixels adjacent to each other in the second direction D2 have the same transmitted light color.

Figure 4:
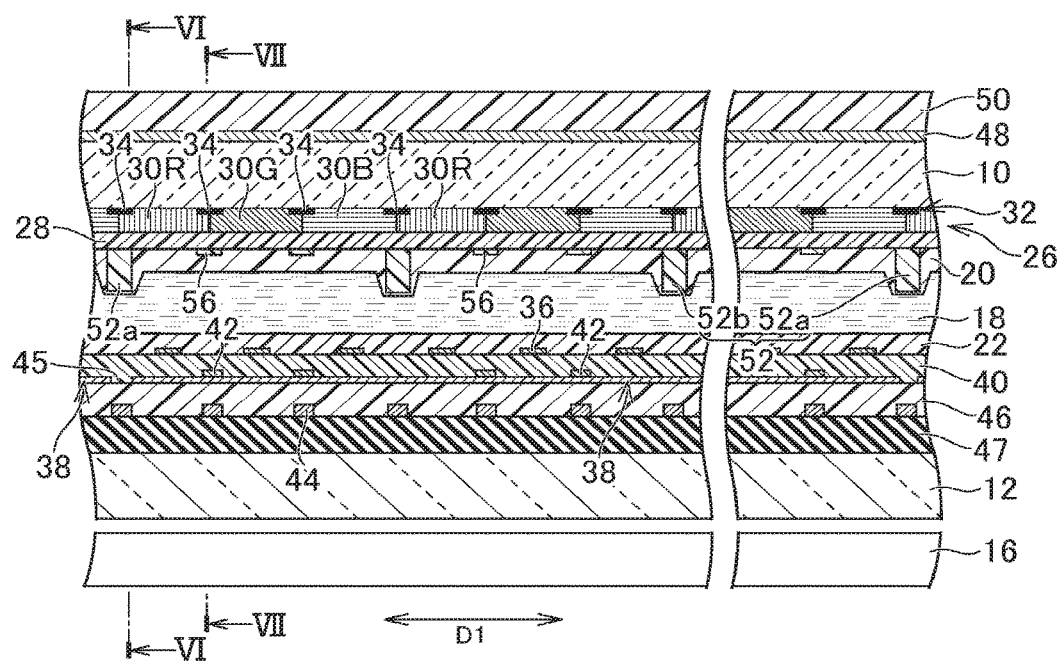
FIG. 4 is a sectional view of a part taken along the line IV-IV in FIG. 2.

FIG. 4 is a sectional view of the part taken along the line IV-IV in FIG. 2. A plurality of light-shielding parts 34, which are a part of the black matrix 32, are disposed on the positions that overlap the video signal lines 44 extending in the second direction D2. The light-shielding parts 34 are disposed at boundaries of the colored layers 30R, 30G, and 30B adjacent to one another in the first direction D1.

The liquid crystal layer 18 is driven by a pair of driving electrodes. In order to drive the liquid crystal layer 18 by a horizontal electric field method, the pair of driving electrodes are formed on the second substrate 12. One of the pair of driving electrodes is pixel electrodes 36. The pixel electrodes 36 are made of transparent conductive material, such as ITO and indium oxide-zinc oxide (IZO), and respectively provided to sub-pixels.

The other one of the pair of driving electrodes is common electrodes 38. An insulating film 40 having light transmissivity is disposed between the pixel electrodes 36 and the common electrodes 38 so as to electrically insulate the electrodes. The common electrodes 38 are made of transparent conductive material, such as ITO or IZO. The common electrodes 38 may be made to be electrically conductive on the entire display area for driving the liquid crystal, although in this embodiment, the common electrodes 38 are electrically separated into some areas to be also used for touch sensing (see FIG. 5). In this regard, the common electrodes 38 are placed at the same potential when displaying an image.

In this embodiment, the common electrodes 38 extend in the second direction D2. The common electrodes 38 are electrically separated by slits 45 that are interposed between the common electrodes 38 and extend in the second direction D2. The common electrodes 38 may not necessarily be provided to sub-pixels respectively. For example, the common electrodes 38 are continuously formed over several tens of pixels on the first direction D1 side. The common electrodes 38 are continuously formed on the entire display area on the second direction side.

The slits 45 between the common electrodes 38 are formed at positions overlapping the light-shielding parts 34 and the video signal lines 44. In the example of FIG. 2, the slits 45 are positioned so as to overlap the light-shielding parts 34 located at the boundaries between the blue (B) colored layers 30B and the red (R) colored layers 30R. At the positions where the slits 45 exist, an electric field generated by the video signal lines 44 spreads into the liquid crystal layer 18, which may cause display distortion. The colored layer 30G is the brightest of the color filter layers, and thus slight display distortion is visible on the colored layer 30G. As such, in order to reduce such influence, the slits 45 are formed between the colored layer 30B and the colored layer 30R.

The common electrodes 38 are in contact and overlapped with auxiliary wirings 42. The insulating film 40 having light transmissivity insulates the auxiliary wirings 42 from the pixel electrodes 36. One common electrode 38 is in contact and overlapped with at least one auxiliary wiring 42, and the common electrodes 38 and the auxiliary wirings 42 are electrically conducted. The auxiliary wiring 42 has higher conductivity than the common electrode 38. As such, a composite electrode formed of the auxiliary wiring 42 and the common electrode 38 has higher conductivity than the common electrode 38 alone, and thus the composite electrode easily conduct a signal and serves to stabilize a display image.

The auxiliary wirings 42 are made of metal, for example, and have light-shielding property. The auxiliary wirings 42 are respectively at positions that overlap the light-shielding parts 34. The auxiliary wirings 42 extend along the light-shielding parts 34 in the second direction D2 (see FIG. 7).

The video signal lines 44, which supply image signals, are provided between the common electrodes 38 and the second substrate 12 and extend in the second direction D2. The common electrodes 38 and the video signal lines 44 are insulated from each other by an insulating layer 46 having light transmissivity. As shown in FIG. 4, the video signal lines 44 overlap the light-shielding parts 34 of the black matrix 32.

The liquid crystal display device in this embodiment includes touch sensing functions. The touch sensing functions are enabled by a pair of touch electrodes for detecting a touch using electrostatic capacity. One of the pair of touch electrodes is the common electrodes 38 described above. The other one of the pair of touch electrodes is a plurality of detect electrodes 48.

Figure 5:
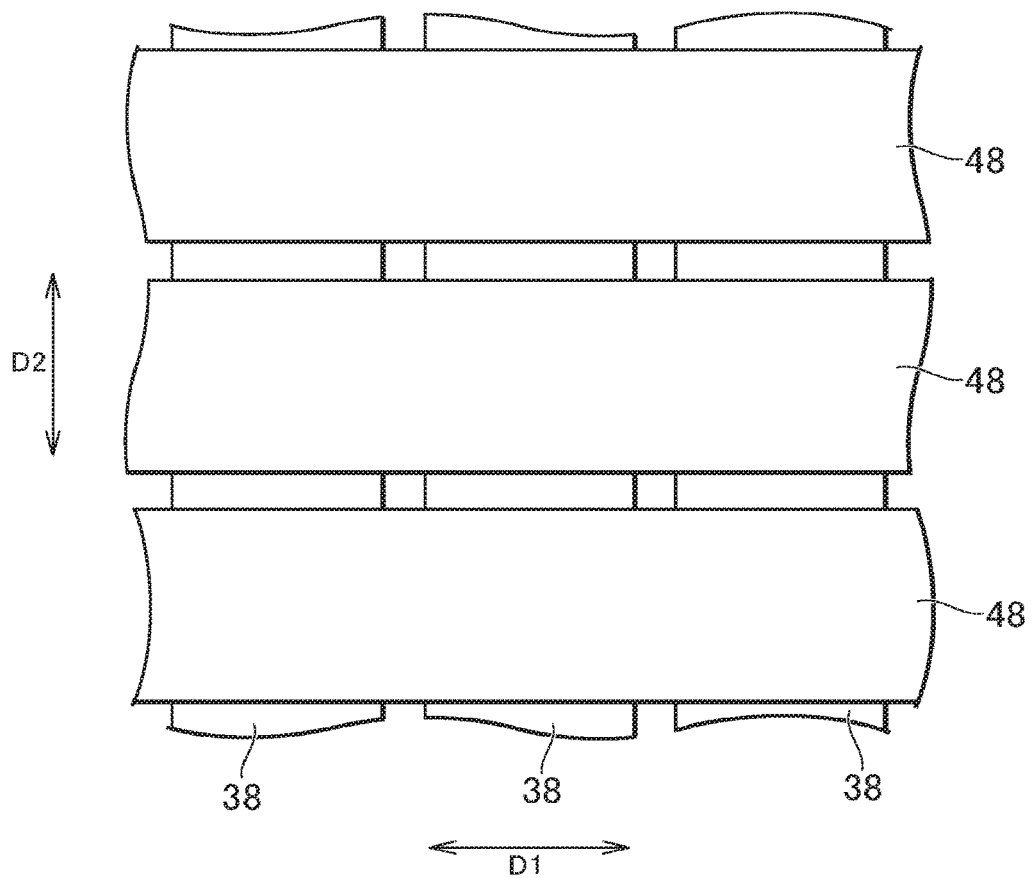
FIG. 5 is a plan view of common electrodes and detect electrodes.

FIG. 5 is a plan view of the common electrodes 38 and the detect electrodes 48. The detect electrodes 48 are arranged at intervals in the second direction D2, and each extend in the first direction D1. Similarly to the common electrodes 38, the detect electrodes 48 have a wide width so as to overlap across a plurality of sub-pixels. The detect electrodes 48 are made of transparent conductive material, such as ITO or IZO, or metal material having light-shielding property. As shown in FIGS. 3 and 4, the detect electrodes 48 are laminated on the first substrate 10 on the side opposite to the color filter layer 26. The detect electrodes 48 may be formed so as to adhere to the first substrate 10. A protective layer 50 made of insulating material, such as resin, covers the detect electrodes 48.

As shown in FIGS. 3 and 4, sub-spacers 54 are disposed between the first substrate 10 and the second substrate 12. As shown in FIG. 3, the sub-spacer 54 is lower than the main spacer 24 in height. As such, there is a gap on the second substrate 12 side. With this configuration, the sub-spacers 54 prevent the first substrate 10 and the second substrate 12 from approaching each other when the first substrate 10 and the second substrate 12 are pressed from outside. Similar to the main spacers 24, the sub-spacers 54 are basically columnar, and disposed at positions where the scan signal lines 43 intersect the video signal lines 44.

Wall-like sub-spacers 52 are covered by the first alignment film 20. That is, the first alignment film 20 is disposed between the wall-like sub-spacers 52 and the liquid crystal layer 18. The wall-like sub-spacers 52 have light attenuation property (e.g., light-shielding property). Even if the wall-like sub-spacers 52 transmit light, such light has grey color, and the wall-like sub-spacers 52 absorb light such that the light appears to be an achromatic color.

Figure 6:
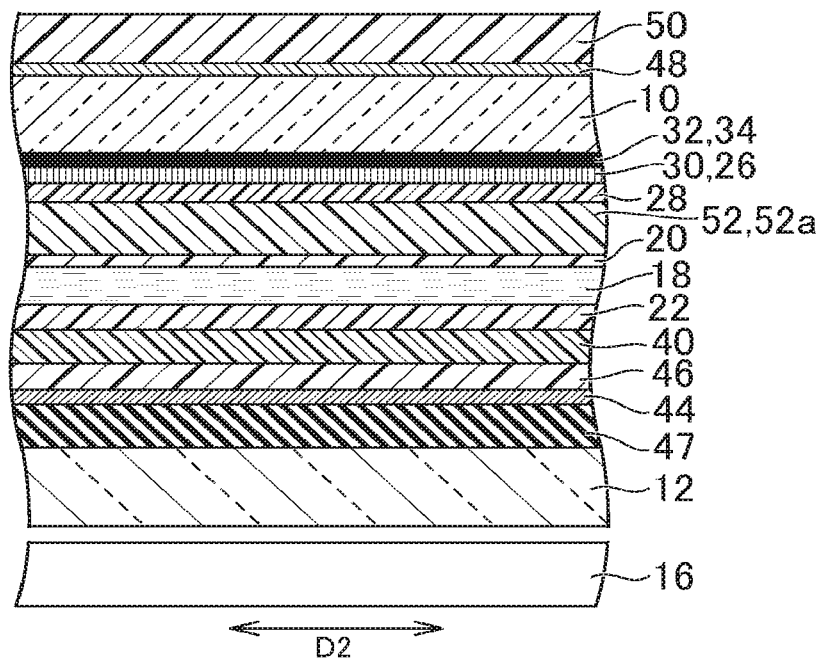
FIG. 6 is a sectional view of a part taken along the line VI-VI shown in FIGS. 2 and 4.
Figure 7:
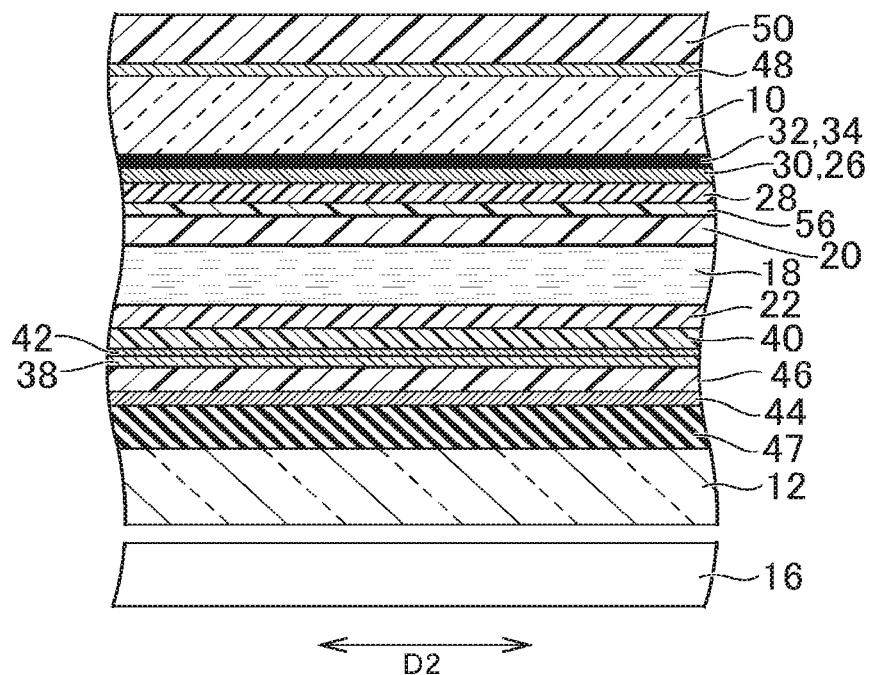
FIG. 7 is a sectional view of a part taken along the line VII-VII shown in FIGS. 2 and 4.

FIG. 6 is a sectional view of the part taken along the line VI-VI shown in FIGS. 2 and 4. FIG. 7 is a sectional view of the part taken along the line VII-VII shown in FIGS. 2 and 4.

As shown in FIG. 6, the wall-like sub-spacers 52, which continue in the first direction D1 in a wall shape, are formed between the sub-spacers 54. The width of the wall-like sub-spacer 52 is substantially the same as that of the light-shielding part 32, and narrower than the diameter of the wall-like sub-spacer 52 (see FIG. 2). In FIG. 3 (the sectional view of the part taken along the line III-III in FIG. 2), a portion having a wide width is the sub-spacer 54, and in FIG. 4 (the sectional view of the part taken along the line IV-IV in FIG. 2), a portion having a narrow width is the wall-like sub-spacer 52. The sub-spacer 54 and the wall-like sub-spacer 52 are formed in the same height.

The wall-like sub-spacers 52 are also formed between the main spacers 24 and the sub-spacers 54. The wall-like sub-spacers 52 between the main spacers 24 and the sub-spacers 54 are formed in the same height of the wall-like sub-spacers 52 between the sub-spacers 54 (see FIGS. 2 and 4).

The wall-like sub-spacers 52, the main spacers 24, and the sub-spacers 54 are all formed of the same resist material for photospacers. As such, the wall-like sub-spacers 52 are integrally formed with the main spacers 24 or the sub-spacers 54. The main spacers 24, the wall-like sub-spacers 52, and the sub-spacers 54 are different in height from one another, bur can be formed by a half exposure process.

The wall-like sub-spacers 52 are divided into a first group of wall-like sub-spacers 52a and a second group of wall-like sub-spacers 52b depending on the positions to be disposed. As shown in FIG. 4, the first group of wall-like sub-spacers 52a cover the area of the slits 45 between the common electrodes 38. The auxiliary wiring 42 is not able to be disposed in the area where the slits 45 are disposed. In such an area, the light-shielding property to block oblique light rays from the backlight 16 is deteriorated because of lacking the auxiliary wiring 42. The first group of wall-like sub-spacers 52a are disposed to prevent color mixture in such an area.

The second group of wall-like sub-spacers 52b cover the area where the slit 45 is not formed on the common electrodes 38 and the auxiliary wiring 42 is not formed. In other words, the auxiliary wiring 42 is not disposed at the position where the second group of wall-like sub-spacers 52b are disposed. The auxiliary wiring 42 is basically disposed at the position that overlaps the video signal line 42. As described above, the common electrodes 38 are formed over several tens of pixels, and thus cover several tens of video signal lines 44. As such, in view of manufacturing costs, for example, the auxiliary wirings 42 are not disposed on the entire video signal lines 44, but partially removed. In this case, color mixture highly likely occurs in the area where the auxiliary wiring 42 is not provided. The second group of wall-like sub-spacers 52b are disposed in order to prevent color mixture in such an area.

As shown in FIG. 4, a plurality of light attenuation layers 56 are formed at positions where the wall-like sub-spacers 52 are not disposed so as to respectively overlap the auxiliary wirings 42. The light attenuation layers 56 have light attenuation property (light-shielding property). Such light-shielding property may be the same as the property that the wall-like sub-spacers 52 have. The light attenuation layers 56 are lower than the wall-like sub-spacers 52 in height. The light attenuation layers 56 are disposed between the first alignment film 20 and the overcoat layer 28. The light attenuation layers 56 are low enough so that the surface (the surface in contact with the liquid crystal layer 18) of the first alignment film 20 that covers the light attenuation layers 56 are flat.

The auxiliary wiring 42 is disposed in the area where the light attenuation layers 56 are formed, and thus oblique light rays from the backlight 16 are easily blocked. However, since slight light leakage may occur, the light attenuation layers 56 are provided so as to shield such light rays and to efficiently prevent color mixture.

Figure 9:
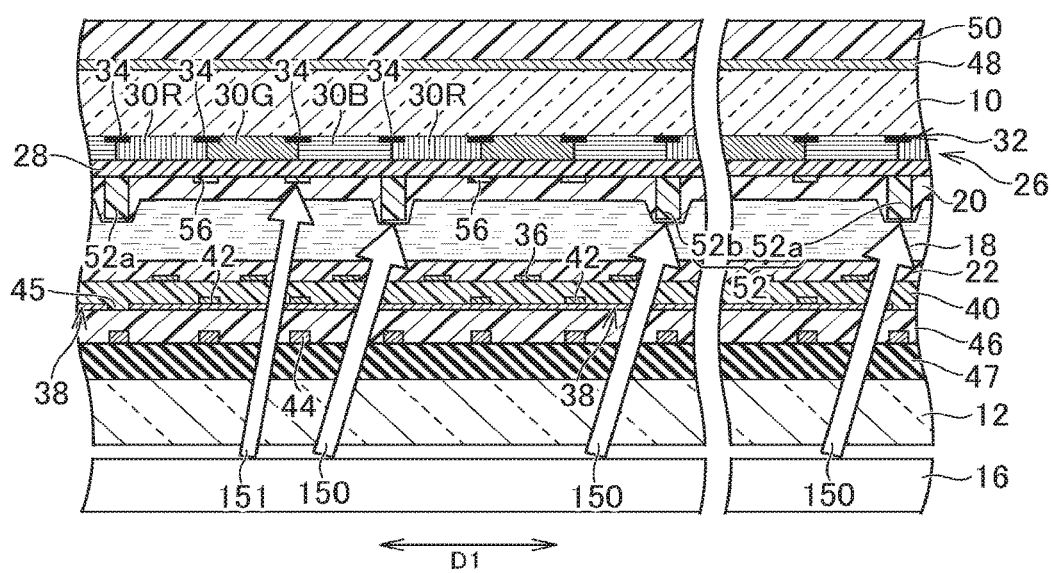
FIG. 9 is a diagram illustrating an image of color mixture prevention in the embodiment.

FIG. 9 is a diagram illustrating an image of color mixture prevention in this embodiment. The wall-like sub-spacers 52 can prevent oblique light rays 150 from the backlight 16, which are entered from the positions where the auxiliary wiring 42 is not formed, from entering the adjacent sub-pixels. The light attenuation layers 56 can prevent oblique light rays 151, which occur at areas other than the positions described above, from entering the adjacent sub-pixels.

Figure 8:
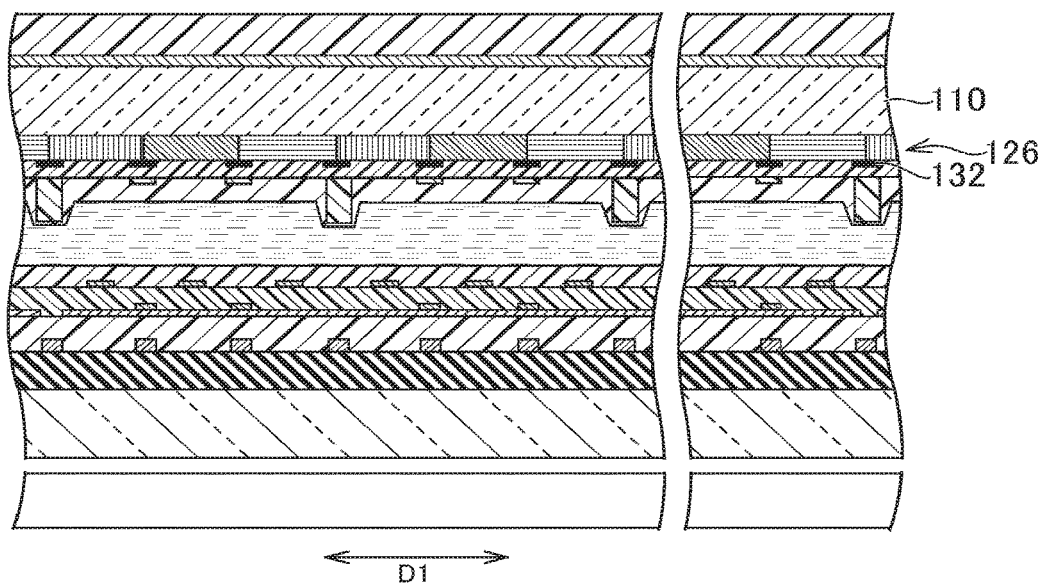
FIG. 8 is a diagram illustrating the liquid crystal display device according to a variation of the embodiment to which the present invention is applied.

FIG. 8 is a diagram illustrating the liquid crystal display device according to a variation of the embodiment to which the present invention is applied. As can be seen from the comparison of FIG. 4 and FIG. 8, the liquid crystal display device shown in FIG. 8 includes a black matrix 132 on the color filter layer 126 on the side opposite to the first substrate 110. In the manufacturing process, the color filter layer 126 is formed on the first substrate 110, and the black matrix 132 is formed on the color filter layer 126. In this embodiment, the black matrix 132 is located closer to the liquid crystal layer 18, which serves to shield light rays from the backlight 16 and to efficiently prevent color mixture.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device comprising:
   a first substrate;
   a second substrate; and
   a liquid crystal layer between the first substrate and the second substrate, wherein
   the first substrate comprises:
      a plurality of pixel electrodes that are one of a pair of driving electrodes for driving the liquid crystal layer;
      a plurality of common electrodes on which slits are disposed at predetermined intervals in a first direction and which extend in a second direction intersecting the first direction; and
      a plurality of auxiliary wirings that are disposed at intervals in the first direction, extend in the second direction, and are in contact with and overlap the common electrodes, and
   the second substrate comprises:
      a plurality of spacers that keep a space between the first substrate and the second substrate;
      a plurality of wall-like sub-spacers that extend in the second direction, are lower than at least one of the spacers in height, and have a wall-like shape; and
      a color filter layer in which at least pixels adjacent in the first direction have different colors from each other, and
   the wall-like sub-spacers are disposed at positions that overlap the slits.

2. The liquid crystal display device according to claim 1, wherein
   the spacers include main spacers and sub-spacers that are lower than the main spacers in height, and
   the wall-like sub-spacers have a same height as a height of the sub-spacers.

3. The liquid crystal display device according to claim 2, wherein
   the wall-like sub-spacers are formed continuously with the main spacers or the sub-spacers.

4. The liquid crystal display device according to claim 1, wherein
   the first substrate includes a plurality of scan signal lines extending in the first direction and a plurality of video signal lines extending in the second direction, and
   the wall-like sub-spacers are disposed at positions that overlap the video signal lines.

5. The liquid crystal display device according to claim 4, wherein
   the video signal lines are formed oblique to a direction perpendicular to the direction in which the scan signal lines extend.

6. The liquid crystal display device according to claim 4, wherein
   the second substrate has a black matrix at a position on which the scan signal lines overlap the video signal lines.

7. The liquid crystal display device according to claim 1, wherein
   the first substrate includes a light attenuation layer at a position that overlaps the auxiliary wirings, the light attenuation layer being lower than the wall-like sub-spacers in height.

8. The liquid crystal display device according to claim 1, wherein
   the color filter layer has at least three colors of red, blue, and green, and
   the wall-like sub-spacers are formed between the red color pixels and the blue color pixels.

9. The liquid crystal display device according to claim 1, wherein
   the first substrate has a detect electrode on a side opposite to the liquid crystal layer, and
   the common electrodes and the detect electrode function as a capacitive touch panel.

10. The liquid crystal display device according to claim 1, further comprising a backlight disposed on the first substrate on a side opposite to the liquid crystal layer.

* * * * *